United States Patent [19]

North et al.

[11] Patent Number: 4,602,584

[45] Date of Patent: Jul. 29, 1986

[54] PROPULSION DEVICE FOR A SHIP

[76] Inventors: Henry North, R.R. #16, Thunder Bay, Ontario, Canada, P7B 5E5; David J. Dowhos, 222 Crescent Avenue, Thunder Bay, Ontario, Canada, P7A 7K6

[21] Appl. No.: 781,683

[22] Filed: Sep. 30, 1985

Related U.S. Application Data

[63] Continuation-in-part of Ser. No. 619,924, Jun. 12, 1984, abandoned.

[51] Int. Cl.[4] .............................................. B63H 9/02
[52] U.S. Cl. ...................................... 114/39; 114/103; 416/4
[58] Field of Search .................... 114/39, 102, 103; 440/8, 113; 244/10, 21; 416/4, 7, DIG. 4; 415/90

[56] References Cited

U.S. PATENT DOCUMENTS

| | | | |
|---|---|---|---|
| 1,640,891 | 8/1927 | Fritzel | 415/90 |
| 1,674,169 | 6/1928 | Flettner | 440/37 |
| 2,501,442 | 3/1950 | Donaldson | 416/4 |
| 2,596,726 | 5/1952 | Rydell | 416/4 |
| 3,580,203 | 5/1971 | Martin | 114/102 |
| 4,398,895 | 8/1983 | Asker | 416/4 |
| 4,401,284 | 8/1983 | Austin | 114/103 |

FOREIGN PATENT DOCUMENTS

| | | | |
|---|---|---|---|
| 2430630 | 4/1976 | Fed. Rep. of Germany | 114/102 |
| 124470 | 2/1928 | Switzerland | 244/21 |
| 222845 | 5/1925 | United Kingdom | 416/4 |
| 244791 | 7/1926 | United Kingdom | 114/102 |

Primary Examiner—Trygve M. Blix
Assistant Examiner—Stephen P. Avila
Attorney, Agent, or Firm—Stanley G. Ade; Adrian Battison

[57] ABSTRACT

A propulsion system for a vessel comprises a conventional screw and rudder arrangement and includes one or more rotor sails in the form of an elliptical cylinder upstanding from the deck of the vessel formed from a rigid outer surface which is rotatable about a central longitudinal axis. The rotation by the Magnus effect develops a propulsion force transverse to wind currents crossing the vessel. The speed of rotation, direction of rotation and a position of park of the cylinder can be controlled. The position of park allows the major axis to be aligned with the longitudinal axis of the vessel or with the direction of the wind for feathering or transverse to the longitudinal axis of the vessel to act as a conventional sail downwind.

16 Claims, 8 Drawing Figures

PROPULSION DEVICE FOR A SHIP

This is a continuation-in-part of application Ser. No. 619,924 filed June 12, 1984, now abandoned.

BACKGROUND OF THE INVENTION

This invention relates to a propulsion device for a ship and particularly of the type which comprises an elongate rotatable body which is mounted on the ship in a generally upstanding direction for engaging air currents passing across the ship.

Ships have been known for many years in which such bodies in the form of cylinders, are used as the sole means of propulsion as a replacement for the fabric sails of the conventional type. Devices of this type are shown, for example, in U.S. Pat. Nos. 1,640,891 (Fritzel) and 1,674,169 (Flettner). The device is sometimes known as a Flettner rotor after the inventor of the basic principle.

As is well known, the rotating cylinder uses the Magnus effect to develop a force transverse to a passing air current. The direction of this force can be controlled by varying the speed of rotation of the rotor body.

For a full explanation of these effects, reference can be made to one or other of the above patents.

The Flettner device which was manufactured and used commercially was used as the sole means of propulsion of the ship or boat and steering of the ship was obtained by a rudder of conventional form. However, such an arrangement is not commercially acceptable in relation to modern requirements for manoeuverability and propulsion force even in zero air movement conditions.

SUMMARY OF THE INVENTION

It is one object of the present invention therefore to provide an improved propulsion system of the above general type.

According to the invention, therefore, there is provided a propulsion device for a ship comprising an elongate substantially rigid integral body, means for mounting the body on the ship so as to be upstanding therefrom for engaging air currents passing across the ship, and drive means for rotating the body about the longitudinal axis thereof to develop by the Magnus effect a propulsion force transverse of the direction of the air currents, the body having a cross sectional shape in planes at right angles to the axis which is in the form of a closed curve, the dimension of which in one direction transverse to the axis, is longer than the dimension in a direction at right angles thereto.

It is one advantage of the present invention therefore that it is particularly adapted for use in combination with a conventional screw-type propulsion system of the ship. Specifically, the shape of the body is modified so that it can be feathered, that is turned so that the long axis faces into the wind when the device is not required or when the transverse air movement is stationary. Furthermore, when the wind direction is directly behind the stern of the vessel or ship, the longer axis can be turned at right angles to the length of the ship so as to act as a conventional sail.

It is a further advantage of the invention that the shape of the body allows it to be turned to a direction and maintained in that direction to reduce the effect of gusts and storm force winds.

It is a yet further advantage of the invention that two or more of the bodies can be provided and driven independently so that forces in different directions can be obtained to assist in manoeuvering the vessel even when longitudinally stationary so the rudder is inactive.

It is a yet further important feature of the invention that the body is an elliptical cylinder which preferably has a major to minor axis ratio of 2:1 since this shape has been found to be most effective in providing the required feathering effect while not adversely affecting the propulsion obtained during rotation of the body.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 3 is a cross sectional view along the lines 3—3 of FIG. 1.

In the drawings like characters of reference indicate corresponding parts in the different figures.

DETAILED DESCRIPTION

Figure 1:
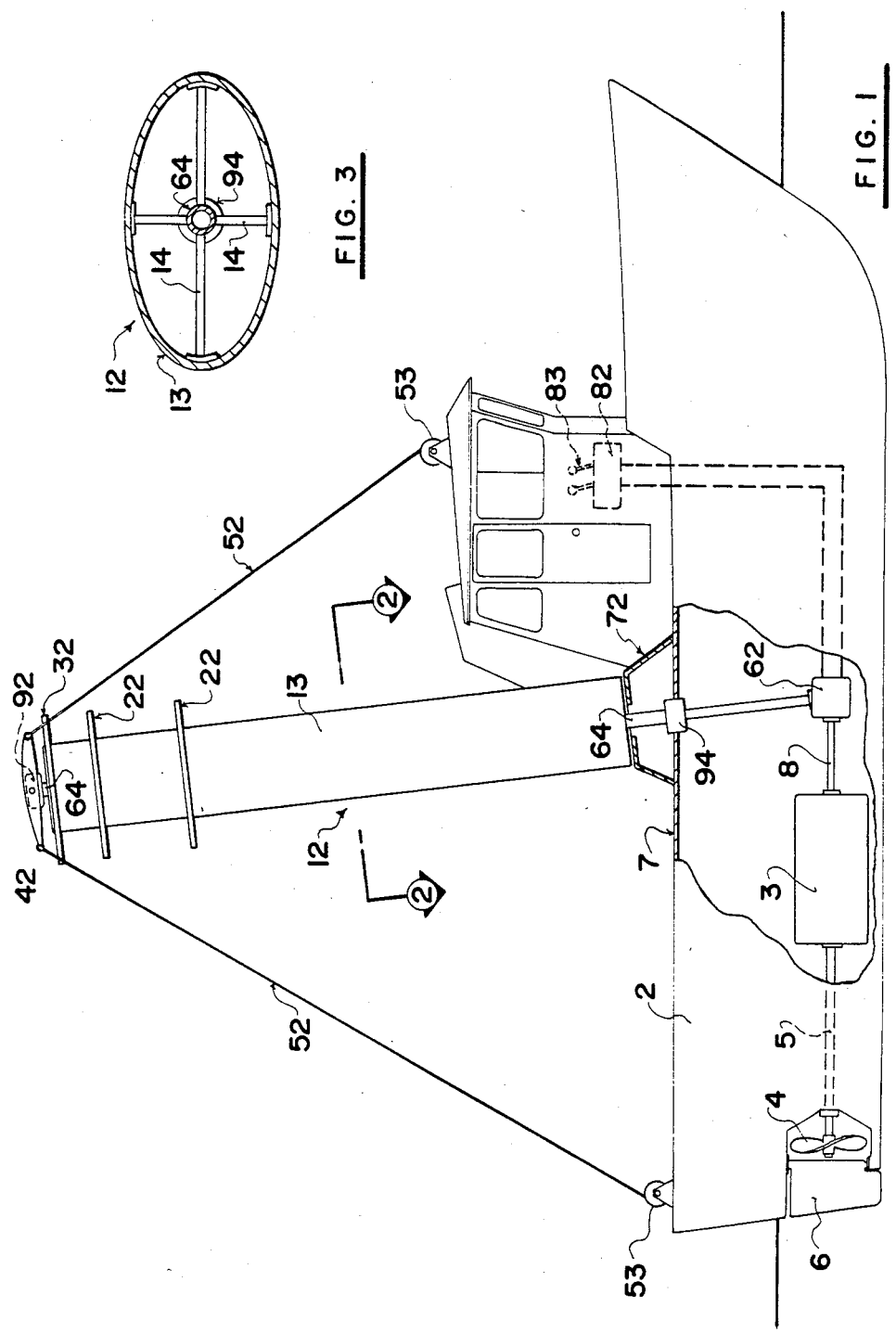
FIG. 1 is a schematic side elevational view of a boat including a propulsion system according to the invention.

The propulsion system is shown mounted upon a boat schematically indicated at 2 which has a conventional engine 3 which can drive a conventional screw 4 through a shaft 5. Also included is a conventional rudder 6. The control systems for the screw 4 and the rudder 6 are not shown, but it will be appreciated that they are of conventional form and enable the vessel to be powered and steered to the required degree of manoeuverability.

In addition to the conventional drive system, there is provided a rotor sail-type propulsion system comprising a pair of rotor sails 12 which are mounted upon the deck of the vessel indicated at 7 so as to be upstanding from the deck for contacting air currents or wind blowing across the deck.

Each rotor sail 12 is mounted on a shaft 64 which extends along the length of the rotor sail and is mounted in bearings 92 and 94 at the top and bottom ends respectively of the shaft 64.

The bearing 94 is supported on a mount and drive assembly schematically indicated at 62 supported upon the deck 7. The drive assembly 62 can be self-powered including a suitable motor or can take power from the engine 3 through a drive shaft 8. Control for the drive system 62 is provided by a control unit 82 which generally will be mounted on the bridge of the vessel which includes a pair of levers 83 for controlling the speed and direction of rotation of the shaft 64 and therefore the rotor sail 12 about the shaft 64.

In addition, the levers 83 can be operated to park or halt the shaft 64 at a required angular orientation as will be explained hereinafter.

A shroud 72 is mounted on the upper surface of the drive unit 62 so as to control air currents and prevent them entering the area between the rotor sail 12 and the drive unit 62.

The upper end of the shaft 64 and the bearing 92 are mounted in a spreader beam 42 which extends transversely to the vessel so as to interconnect the two separate rotor sails 12 and to support them in spaced parallel relationship upstanding from the deck. The spreader beam 42 is of streamlined cross section so as to reduce interference with air currents transversely to the vessel and also currents in a fore and aft direction in order to reduce drag. The spacing of the bearings 92 is the same as the spacing of the bearings 94 so that the rotor sails extend in parallel vertical planes longitudinal to the vessel. Guy wires 52 connected to the spreader beam 42 and to the deck 7 support the spreader beam and therefore the rotor sails in the generally upstanding direction.

Figure 2:
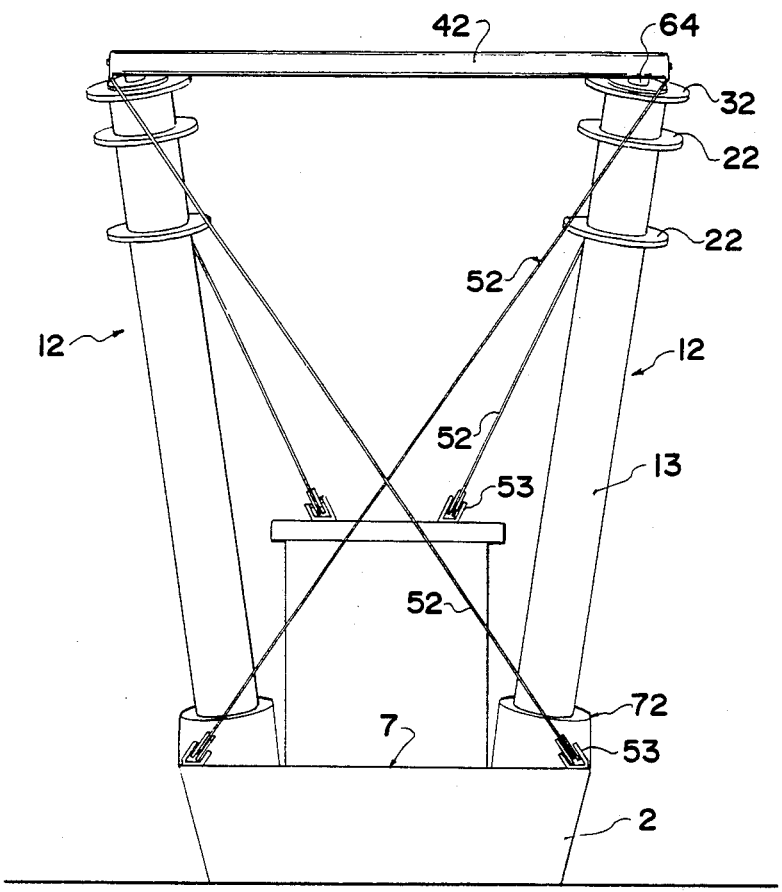
FIG. 2 is a rear elevational view of the boat of FIG. 1.

As shown, the rotor sails are generally inclined rearwardly through an angle 10 and this angle can be adjusted by suitable winch mechanisms 53 which control the position of the guy wires 52. As shown in FIG. 2, the guy wires at the rear of the spreader beam are crossed so as to provide lateral support for the spreader beam as well as longitudinal support so that the spreader beam is held in position both transversely and longitudinally of the vessel against forces from transverse air currents and from longitudinal thrust.

The rotor sail 12 as shown in cross section in FIG. 3, is formed from a rigid metal elliptical outer surface 13 which may be manufactured in sections and is supported relative to the shaft 64 by struts 14 thus forming a rigid integral body which rotates about the axis 64 which lies at the centre of the ellipse. The rotor sail 12 is therefore in the form of an elliptical cylinder and preferably the ratio of major to minor axis of the ellipse is 2:1 and lies in the range 1.05:1 to 3:1.

The shape of the rotor sail in cross section is therefore non-circular and forms a smooth curve without inversion. The shape may be modified from a strict mathematical ellipse to include any smoothly curved elongate cross section without inversion.

The struts 14 may be provided at suitable positions along the length of the outer metal surface 13 in accordance with good engineering practice to provide sufficient support and prevent the body from flexing in the winds that it is expected to encounter.

An end plate 32 which may be circular or elliptical or of the same cross section as the surface 13, is positioned at the top end of the rotor sail 12 and lies in a plane at right angles to the axis 64 and extends outwardly from the periphery of the surface 13. In addition, boundary fences 22 parallel to and co extensive with the end cap 32 may be positioned along the length of the rotor sail at various positions. These transverse guides provided by the plates 22, 32 act to control the movement of the air currents across the rotor sail to prevent or inhibit the formation of vortices and eddy currents.

In operation, the rotor sails 12 are rotated about the axis 64 at a speed which is correlated to the speed of transverse air currents so that the positions of increase and reduction of pressure on opposite sides of the rotor sail are correlated with the forward direction of the vessel. When the air currents are directly from one side or transverse to the vessel, the speed of rotation of the rotor sails 12 is equated to the speed of the air currents since this produces the maximum force at the minimum power usage.

It will, of course, be appreciated that should a braking force be required to slow the vessel in an emergency or any other occasion, the rotation can be reversed to produce a force in the aft direction. In addition, although normally the rotor sails will be rotated in the same direction in order to produce a propulsion force forwardly of the vessel, when required they can be rotated in opposite directions or at different rotational speeds in order to provide a couple which can be used to manoeuver the vessel even when there is no forward movement thus negating the effect of the rudder 6.

Furthermore, the control device 82 incorporates means for parking the rotor sails 12 at desired orientations relative to the axis provided by the shaft 64. Thus, when the conventional propulsion unit is being used and the rotor sail device is not used for reasons of insufficient air currents or any other reason, the major axis of the ellipse can be aligned with the forward direction of the vessel so as to feather the rotor sails and reduce the drag of the rotor sails to forward motion provided by the conventional propulsion system.

Alternatively, the rotor sails can be parked in a position such that the major axis lies parallel to the wind direction thus again feathering the rotor sails in a condition when the wind lies transverse to the vessel and the rotor sail propulsion system is not being used. This can, of course, be of great value when the wind force is excessive in storm conditions.

In a further alternative, the rotor sales can be parked with a major axis transverse to the vessel so as to act as a conventional sail for sailing downwind under conventional propulsion.

Figure 4:
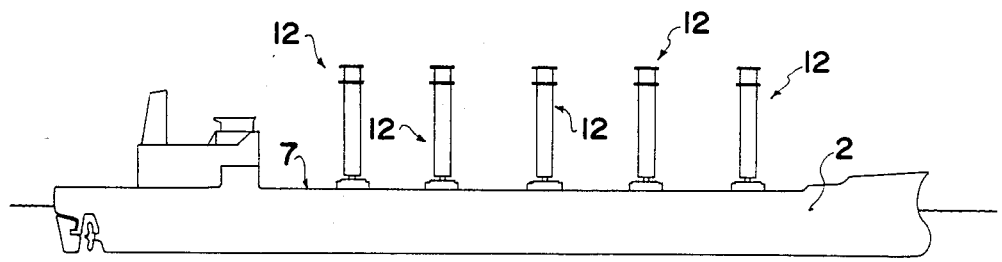
FIG. 4 is a side elevational view of a marine vessel including a propulsion system according to the invention.

It will be appreciated that the rotor sails 12 can be used singly on a small vessel or in multiple units on a very much larger vessel. Although shown side by side in FIG. 2, it is possible that they be mounted one behind the other and, for example, FIG. 4 shows an arrangement for a large seagoing vessel which includes five such rotor sails 12 mounted directly vertically and in line centrally of the vessel.

Figure 5:
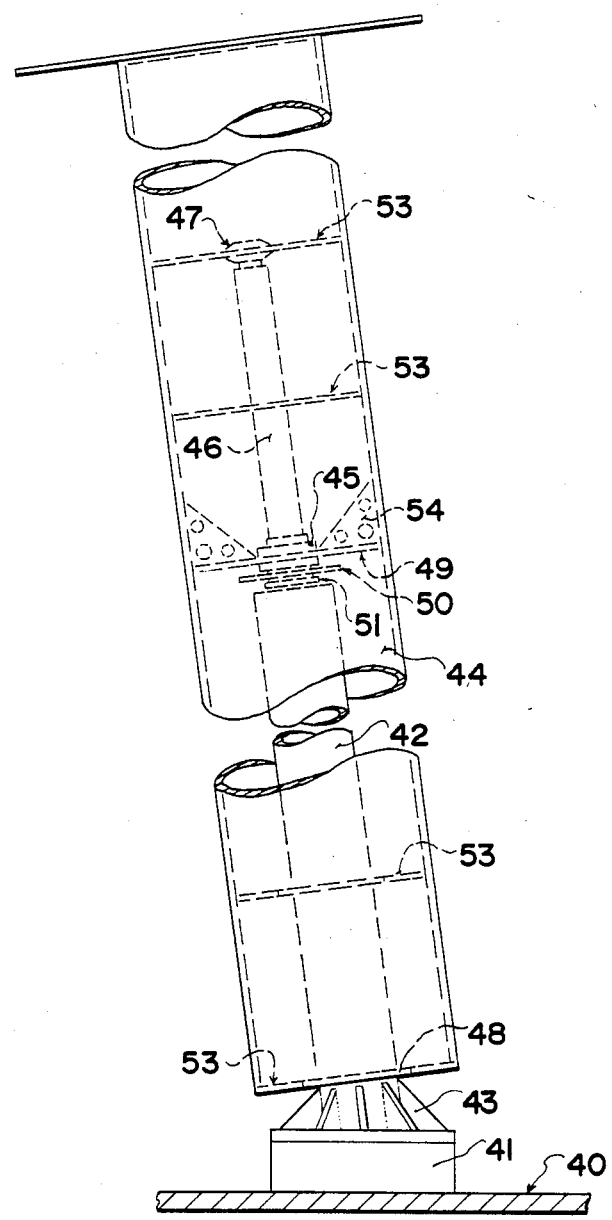
FIG. 5 is a front elevational view of a modified rotor which can be self supported.

Referring now to FIG. 5, a support structure for a rotor is illustrated in detail. Specifically, the deck is indicated at 40 with a pedestal schematically indicated at 41. The pedestal supports an inclined support tube 42 with triangular support flanges 43 enabling the tube 42 to be maintained in the proper inclined position despite side winds.

The rotor is indicated at 44 and is of the structure and shape previously described. The rotor is carried on the support tube 42 by a central bearing 45 carried on an extension portion 46 of the tube 42 which is of smaller diameter. At the end of the portion 46 is provided a further bearing 47 for supporting the rotor at a position approximately three-quarters of the height of the rotor. The central bearing 45 is arranged approximately at the mid-point of the rotor and at the bottom of the rotor, rollers 48 carried on the rotor run on an outer surface of the tube 42 to provide a bottom bearing for the rotor.

Drive to the rotor is communicated at the central bearing on a disc 49 which supports the rotor relative to the outer race of the bearing 45. The disc 49 is directly connected to a brake disc 50 and also to a drive pulley 51. The brake disc 50 is used to brake the rotor in the desired angular orientation as previously explained and the drive pulley 51 is used to drive the rotor for rotation at the required speed as previously explained.

Transverse support spiders 53 are arranged at suitable locations in the height of the rotor to support the rotor relative to the bearings and to provide structural stability thereof. In addition, the disc 49 is connected to the walls of the rotor by triangular support plates 54.

Figure 6:
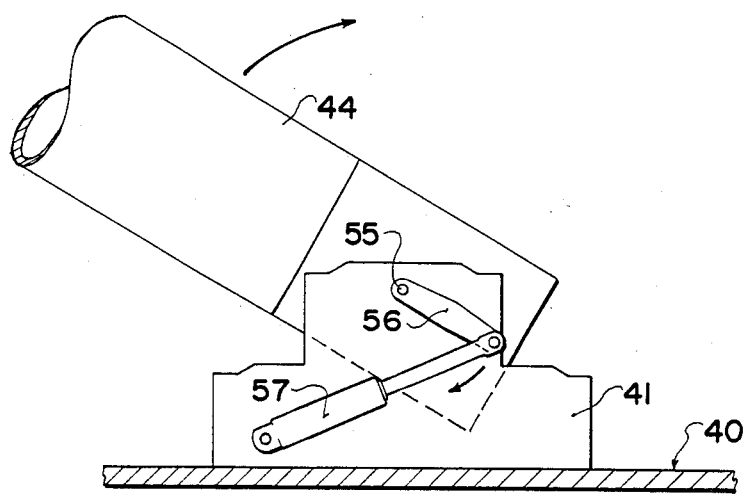
FIG. 6 is a schematic partial side elevational view of the rotor of FIG. 5 showing a retraction system.

Turning now to FIG. 6, the rotor 44 of FIG. 5 is mounted on the pedestal 41 for pivotal movement about an axle 55. A lever 56 can be actuated by a hydraulic actuator cylinder 57 in order to tilt the rotor 44 to a lowered position. The position shown in FIG. 6 is at a partly lowered position and in the completely lowered position, the rotor lies effectively along the deck so that it does not interfere in any way with manoeuvering of the vessel under normal screw power.

Figure 7:
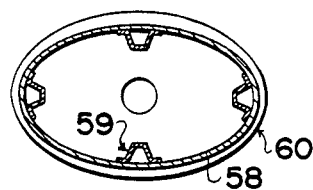
FIG. 7 is a schematic plan view of a rotor.

FIG. 7 shows an internal structure of a rotor having longitudinal support struts. Specifically, the rotor wall is indicated at 58 with longitudinal hatsection support struts indicated at 59. An outer hoop 60 clamps around the skin 58 of the rotor to retain the structure in fixed condition.

Figure 8:
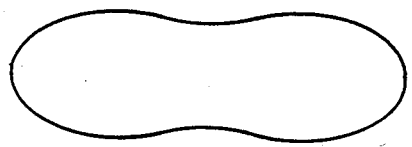
FIG. 8 is a plan view of a rotor showing a modified cross sectional shape.

FIG. 8 shows an alternative shape of rotor which is acceptable, that is specifically a pinched-waist ellipse which provides the elongate smoothly curved shape defined previously.

Since various modifications can be made in our invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A propulsion device for a ship comprising an elongate substantially rigid integral body, means for mounting the body on the ship so as to be upstanding therefrom for engaging air currents passing across the ship, said rigid body having a cross sectional shape in planes transverse thereto which is in the form of a smooth closed curve free from inversions, the dimension of which in the direction of a major axis is longer than the dimension in the direction of a minor axis at right angles thereto, and powered drive means for causing rotation of the rigid body about a single axis longitudinal thereto such that both said major and minor axes rotate about the longitudinal axis to develop by the Magnus Effect a propulsion force transverse to the direction of the air currents, said drive means including means for halting said rotation at an angular orientation of said major and minor axes of said body about said longitudinal axis, said halting means being arranged such that said angular orientation can be adjusted to a plurality of different positions around said axis.

2. The invention according to claim 1 wherein the closed curve is elliptical.

3. The invention according to claim 2 wherein the body is an elliptical cylinder.

4. The invention according to claim 2 wherein the ratio between the major and minor axes of the ellipse is 2:1.

5. The invention according to claim 1 wherein the body includes a plurality of plates arranged at right angles to the axis and extending outwardly from the outer periphery of the body.

6. The invention according to claim 1 wherein the drive means includes means for varying the speed of rotation of the body and means for reversing the direction of rotation of the body.

7. The invention according to claim 1 wherein said halting means is arranged such that when said body is halted said major axis lies parallel to the direction of the air currents.

8. The invention according to claim 1 wherein said halting means is arranged such that when said body is halted said major axis lies longitudinally to the ship to reduce drag during forward movement of the ship.

9. The invention according to claim 1 wherein said halting means is arranged such that when said body is halted said major axis lies transverse to the ship so that the body acts as a stationary sail in air currents which are parallel to the direction of movement of the ship.

10. The invention according to claim 1 wherein the body is exposed to air currents around the full extent of its periphery.

11. The invention according to claim 1 including a plurality of such bodies, means for mounting each such body on the ship in generally upstanding relationship and means for driving said bodies, said driving means including means for independently varying the angular velocity of each of said bodies and the direction of rotation of each of said bodies whereby propulsion in different directions can be obtained for manoeuvering the ship.

12. The invention according to claim 1 including two such bodies, means for mounting said bodies on said ship in a generally upstanding direction, said mounting means being arranged such that a line joining the axes of each of said bodies lies transverse to the ship and including a beam interconnecting the upper ends of the bodies and extending transversely to the ship and elongate flexible support means for extending from the beam to the ship.

13. The invention according to claim 1 including a conventional screw type propulsion system which can be used in combination with the body and as an alternate to the body.

14. The invention according to claim 1 including means for adjusting the inclination of the body relative to the vertical in a vertical plane longitudinal to the ship.

15. A propulsion device for a ship comprising an elongate substantially rigid integral body, means for mounting the body on the ship so as to be upstanding therefrom for engaging air currents passing across the ship, said rigid body having a cross sectional shape in planes transverse thereto which is in the form of a smooth closed curve free from inversions, the dimension of which in the direction of a major axis is longer than the dimension in the direction of a minor axis at right angles thereto, and powered drive means for causing rotation of the rigid body about a single axis longitudinal thereto such that both said major and minor axes rotate about the longitudinal axis to develop by the Magnus Effect a propulsion force transverse to the direction of the air currents, said drive means including means for halting said rotation at an angular orientation of said major and minor axes of said body about said longitudinal axis, said halting means being arranged such that said angular orientation can be adjusted to a plurality of different positions around said axis wherein said halting means is arranged such that when said body is halted said major axis lies longitudinally to the ship to reduce drag during forward movement of the ship.

16. A propulsion device for a ship comprising an elongate substantially rigid integral body, means for mounting the body on the ship so as to be upstanding therefrom for engaging air currents passing across the ship, said rigid body having a cross sectional shape in planes transverse thereto which is in the form of a smooth closed curve free from inversions, the dimension of which in the direction of a major axis is longer than the dimension in the direction of a minor axis at right angles thereto, and powered drive means for causing rotation of the rigid body about a single axis longitudinal thereto such that both said major and minor axes rotate about the longitudinal axis to develop by the Magnus Effect a propulsion force transverse to the direction of the air currents, said driven means including means for halting said rotation at an angular orientation of said major and minor axes of said body about said longitudinal axis, said halting means being arranged such that said angular orientation can be adjusted to a plurality of different positions around said axis, wherein said halting means is arranged such that when said body is halted said major axis lies transverse to the ship so that the body acts as a stationary sail in air currents which are parallel to the direction of movement of the ship.

* * * * *